Patented Mar. 5, 1946

2,395,875

UNITED STATES PATENT OFFICE 2,395,875

DEHYDROGENATION OF HYDROCARBONS

Kenneth K. Kearby, Elizabeth, N. J., assignor, by mesne assignments, to Jasco, Incorporated, a corporation of Louisiana No Drawing. Application February 14, 1942, Serial No. 430,873

10 Claims. (Cl. 260—669)

This invention relates to the catalytic dehydrogenation of hydrocarbons and is more particularly concerned with improved methods of operation and improved catalysts for use therein.

The process of the invention is applicable to the dehydrogenation of low molecular weight hydrocarbons having 2 to 5 carbon atoms, to the dehydrogenation of higher molecular weight hydrocarbons such as ethylbenzene, and especially to the dehydrogenation of low molecular weight olefins.

Processes for converting butane to butene and butene to butadiene are of increasing importance because butene and butadiene are essential raw materials for the preparation of other products. For example, butene is an essential raw material in alkylation processes for the production of isooctane or other high octane number hydrocarbons suitable for use as motor fuels; isobutene is an essential raw material for the preparation of isobutene polymers of various molecular weights; and butadiene is an essential raw material for the production of synthetic rubbers such as Buna-N, Buna-S and butyl rubber.

In the production of olefins and diolefins by the catalytic dehydrogenation of paraffins and olefins respectively, it is of course desirable to obtain as high a yield of the olefin or diolefin as possible on one passage of the initial material through the dehydrogenation zone and to obtain as small an amount as possible of by-products. It is also desirable to conduct the dehydrogenation under such conditions and in the presence of such catalysts that the formation of coke on the catalysts will be as low as possible. The efficiency of the catalyst is best measured in terms of percent selectivity which means the percent of the total amount of initial material which undergoes conversion which is converted to the desired dehydrogenated product. For example, if 50% of the initial material undergoes conversion in the reaction zone and 30% of this 50% consists of the desired dehydrogenated product, then the percent selectivity would be 60.

I have discovered a new type of catalyst which when used under certain conditions in the dehydrogenation of hydrocarbons makes it possible to obtain substantially greater yields of the desired dehydrogenated product than can be obtained by the use of previously known catalysts. The nature of this new type of catalyst and the conditions under which it is used will be fully understood from the following description:

The new catalysts comprise magnesium oxide as a base material, iron oxide as an active ingredient and a small amount of a promoter which consists of an alkali or an alkaline earth oxide. In addition the catalyst may contain a small amount of a stabilizer which may consist of an oxide of a metal of the right hand side (transition series) of groups I, II and III of the periodic system or certain non-acidic oxides which will be described in more detail below.

The principal function of the promoter in these catalysts is to promote the dehydrogenating activity of the catalyst. The principal function of the stabilizer, when used, is to prevent the promoter from volatilizing or becoming inactive.

In these catalysts the magnesium oxide base should constitute the major proportion of the entire catalyst. The following table gives the ranges of the proportions of each component which may be used:

| Component: | Per cent by weight |
|---|---|
| MgO | 50–95 |
| $Fe_2O_3$ | 3–49 |
| Promoter | 0.5–10 |
| Stabilizer | 0.5–20 |

Among the alkali and alkaline earth oxides which are used as promoters, the oxides of potassium, calcium and strontium generally are preferred.

The following may be used as stabilizers when needed: oxides of metals of the right hand side (transition series) of groups I, II and III of the periodic system, particularly oxides of copper, silver, zinc, and cadmium; non-acidic transition oxides of chromium, manganese, cobalt and nickel; and non-acidic oxides of thorium, zirconium, cerium, lead, bismuth and aluminum.

One especially effective catalyst of this type has the following approximate composition:

| Component: | Per cent by weight |
|---|---|
| MgO | 72.4 |
| $Fe_2O_3$ | 18.4 |
| $K_2O$ | 4.6 |
| CuO | 4.6 |
| | 100.0 |

This catalyst may be prepared in a number of different ways but one suitable method is as follows:

Magnesia is mixed with a solution of ferric nitrate. Ammonium hydroxide may be added to the mixture to ensure complete precipitation. The magnesia with ferric hydroxide precipitate is washed and then mixed with solutions of copper and potassium nitrate. The resulting mixture is dried, heated to 1000° F., and then molded into pills or lumps of any suitable size and shape. It will be understood that the proportions of the various materials used in the preparation will be such as to produce a final mixture containing the oxides in the required amounts. The form in which the catalyst is prepared will of course depend upon whether it is to be used in fixed or stationary form or in finely divided form suspended in the vapors of hydrocarbon to be dehydrogenated.

In carrying out the process using catalysts of the type above described, the hydrocarbon, preferably with steam, is passed over the catalyst at a rate between 50 and 5000, preferably between 100 and 1000 volumes (measured at normal temperature and pressure) of hydrocarbon per volume of catalyst per hour. The ratio of steam to hydrocarbon is between 15:1 and 1:1, preferably from 8:1 to 4:1. The reaction chamber is maintained at a temperature between 1000 and 1600° F., preferably between 1100 and 1300° F. and under atmospheric, below atmospheric or above atmospheric pressure. The hydrocarbon which passes through the reaction zone unaffected may of course be recycled thereto.

The principal function of the steam is to dilute the hydrocarbon and thus reduce the partial pressure thereof in the reaction zone. At the same time, however, the steam performs another useful function in that it reacts with coke which may be deposited on the catalyst to form carbon oxides and hydrogen. The elimination of at least a portion of the coke in this manner tends to prolong the time the catalyst can be used before it requires regeneration. Thus the reaction portion of a complete cycle of reaction and regeneration may be as long as 15, 25 or 50 hours or more although it is usually preferable in operation to run for periods of ½ hour to 7 hours and then regenerate. It is found that with these magnesium oxide—iron oxide catalysts, calcium oxide and potassium oxide are especially effective in promoting the water gas reaction, i. e. the reaction between coke and steam.

Regeneration of the catalyst may be effected by shutting off the flow of hydrocarbon and passing steam, air, or a mixture of steam and air through the catalyst mass while it is maintained at a temperature between 1100 and 1300° F. Following substantially complete removal of coke from the catalyst in this manner, the flow of hydrocarbon and steam may be resumed.

One particularly effective type of operation using a finely divided, suspended catalyst is that which may be called "fluid catalyst operation." By the term "fluid catalyst operation" is meant that the size of the catalyst particles, the quantity of catalyst, the quantity of hydrocarbon-steam mixture and the linear velocity of the mixture are so adjusted that the entire mass behaves in much the same way as a fluid and may be pumped and circulated through the apparatus like a fluid.

In carrying out a catalytic dehydrogenation with these catalysts it is frequently desirable to introduce small quantities of the promoter with the feed in order to replace that which may be volatilized or otherwise lost from the system. This is particularly desirable when alkali oxides, such as potassium oxide, are used as promoters.

When it is desired to prepare butadiene by the catalytic dehydrogenation of butene in the presence of the catalysts described above, one suitable source of the butene feed is the $C_4$ cut of the gases obtained in the thermal or catalytic cracking of hydrocarbon oils. A normal butene fraction may be obtained from the $C_4$ cut by selective extraction or absorption. Unreacted butene in the product may be similarly purified prior to recycling.

The following data illustrate the relative effectiveness of various promoters when added in amounts of 1.5 parts by weight to a base catalyst consisting of 78.5 parts by weight of magnesium oxide, 20 parts by weight of iron oxide and 5 parts by weight of copper oxide and used in the dehydrogenation of butene. In each case the catalyst is used for the dehydrogenation of butene at a temperature of 1200° F., a butene feed rate of 800 v./v./hr. and a steam rate of 7 volumes of steam per volume of butene. It will be understood that the best catalyst is one which causes the highest percent conversion and the highest percent selectivity:

| Promoter | Per cent conversion | Per cent selectivity | Per cent butadiene | Per cent coke | Per cent $CO + CO_2$ |
|---|---|---|---|---|---|
| $Na_2O$ | 20.3 | 66 | 13 | 0.04 | 1.8 |
| $BaO$ | 24.4 | 66 | 16 | 0.4 | 4.4 |
| $SrO$ | 29.7 | 57 | 17 | 0.7 | 7.9 |
| None | 19 | 71 | 13 | 1.0 | 2.0 |
| $K_2O$ | 30 | 74 | 22 | 0.04 | 2.4 |
| $CaO$ | 38.5 | 54 | 20 | 0.41 | 8.5 |
| $Li_2O$ | 25.4 | 54 | 14 | 0.5 | 2.9 |
| $K_2O$* | 31 | 80 | 25 | | 2.1 |

*5 parts by weight $K_2O$.

From the above data it will be seen that $K_2O$ is the best promoter for the particular catalyst used because the highest percent conversion and percent selectivity are obtained. It will also be noted that $K_2O$ is effective in promoting the reaction between steam and coke as evidenced by the formation of about 2% of $CO + CO_2$.

Experimental data obtained on a large number of different oxides which may be used as stabilizers indicate that a diverse class of oxides are beneficial. In general, non-acidic oxides such as those of copper, thorium, cobalt, manganese, chromium, aluminum, zinc, lead, zirconium, silver, cadmium, cerium and bismuth may be used. It is found that acidic oxides such as those of vanadium, tin, phosphorus, titanium, molybdenum and tungsten are definitely harmful. Chlorides in general are also found to be harmful.

This invention is not limited by any theories of the mechanism of the reactions nor by any details which have been given merely for purposes of illustration but is limited only in and by the following claims in which it is intended to claim all novelty inherent in the invention.

I claim:

1. An improved process for dehydrogenating hydrocarbons of the class which consists of monoolefins having at least four carbon atoms in the molecule and alkylated aromatics containing at least two carbon atoms in the alkyl group which comprises exposing the hydrocarbons while under dehydrogenating temperature conditions and in the presence of steam to the influence of a catalyst comprising a major portion of magnesia, a lesser proportion of iron oxide and a small amount of potassium oxide.

2. Process according to claim 1 in which the catalyst also contains a small amount of an oxide of a metal of the right hand side of groups I, II and III of the periodic system.

3. Process according to claim 1 in which the catalyst also contains copper oxide.

4. An improved process of dehydrogenating hydrocarbons of the class which consists of monoolefins having at least four carbon atoms in the molecule and alkylated aromatics containing at least two carbon atoms in the alkyl group which comprises passing the vaporous hydrocarbon in admixture with steam over a catalyst comprising 50 to 95% magnesium oxide, 3 to 49% iron oxide and .5 to 10% potassium oxide, while maintained at a dehydrogenating temperature.

5. Process according to claim 4 in which the catalyst also contains from .5 to 20% of copper oxide.

6. An improved process for producing diolefins by the dehydrogenation of olefins which comprises passing the olefin in vaporous condition while admixed with steam over a catalyst comprising a major proportion of magnesium oxide, a lesser proportion of iron oxide and a still smaller proportion of potassium oxide while maintaining the temperature in a range from 1000 to 1600° F.

7. An improved process for producing butadiene from normal butene by dehydrogenation which comprises passing vaporized butene while admixed with steam over a catalyst comprising 50 to 95% magnesium oxide, 3 to 49% iron oxide, and .5 to 10% potassium oxide at a temperature of 1000 to 1600° F.

8. Process according to claim 7 in which the catalyst also contains .5 to 20% copper oxide.

9. An improved process for producing styrene by dehydrogenation of ethyl benzene which comprises passing the vaporized ethyl benzene in admixture with steam over a catalyst comprising 50 to 95% magnesium oxide, 3 to 49% iron oxide, and .5 to 10% potassium oxide while at temperatures of 1000 to 1600° F.

10. Process according to claim 9 in which the catalyst also contains .5 to 20% copper oxide.

KENNETH K. KEARBY.